(12) United States Patent
Sakamoto et al.

(10) Patent No.: US 6,809,885 B1
(45) Date of Patent: Oct. 26, 2004

(54) LENS AND BONDED BODY OF OPTICAL COMPONENT

(75) Inventors: Kazuo Sakamoto, Tokyo (JP); Reikou Fukazaki, Tokyo (JP); Hisashi Inamura, Tokyo (JP); Mitsuo Chikano, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/381,844

(22) PCT Filed: Jan. 9, 2002

(86) PCT No.: PCT/JP02/00050

§ 371 (c)(1),
(2), (4) Date: Mar. 28, 2003

(87) PCT Pub. No.: WO02/056063

PCT Pub. Date: Jul. 18, 2002

(30) Foreign Application Priority Data

Jan. 15, 2001 (JP) .................................. 2001-007019
Dec. 26, 2001 (JP) .................................. 2001-393631

(51) Int. Cl.[7] ............................. G02B 13/18; G02B 3/06
(52) U.S. Cl. ..................................... 359/710; 359/819
(58) Field of Search ..................... 359/619–20, 652–55, 359/754, 804, 808–12, 815, 818–9, 710

(56) References Cited

U.S. PATENT DOCUMENTS

| | | | |
|---|---|---|---|
| 5,576,896 A | 11/1996 | Kitaoka et al. | 359/813 |
| 5,995,304 A | 11/1999 | Nomura et al. | 359/726 |
| 6,631,099 B1 * | 10/2003 | Kouchiyama | 369/13.33 |
| 2002/0005996 A1 * | 1/2002 | Kitamura et al. | 359/819 |
| 2002/0036839 A1 * | 3/2002 | Kishima et al. | 359/819 |

FOREIGN PATENT DOCUMENTS

JP 2000-131508 A 5/2000

OTHER PUBLICATIONS

Microfilm of the specification and drawings annexed to the request of Japanese Utility Model Application No. 4765/1987 (Laid–Open No. 113220/1998), (Alps Electric Co., Ltd.), Jul. 21, 1988, p. 1, line 5 to p. 2, line 3; p. 9, line 10 to p. 13, line 3; Figs. 1–2.
Microfilm of the specification and drawings annexed to the request of Japanese Utility Model Application No. 82672/1981 (Laid–Open No. 195101/1982), (Ricoh Company, Ltd.), Dec. 10, 1982, Full text, all drawings.
International Search Report for PCT/JP02/00050 dated Feb. 12, 2002.

* cited by examiner

*Primary Examiner*—Jordan M. Schwartz
*Assistant Examiner*—Jessica Stultz
(74) *Attorney, Agent, or Firm*—Sughrue Mion, PLLC

(57) ABSTRACT

A lens having a lens face including a convex area that exhibits the lens function thereof, and a bonding part formed for bonding an additional optical device to the lens face in another part thereof that is not to be the optical path of the lens, in which the bonding part protrudes outside in the direction of the optical axis at least height not lower than the vertex of the convex face. An additional optical device such as an optical filter is bonded to the bonding part of the lens with an adhesive. The lens may be integrated with any other optical device to fabricate small-sized appliances, for example, and suffers little optical loss that may be caused by adhesive having penetrated into the bonded area of the lens and the additional optical device.

8 Claims, 8 Drawing Sheets

FIG.15

LENS AND BONDED BODY OF OPTICAL COMPONENT

TECHNICAL FIELD

The present invention relates to a lens and an optical composite structure, in particular, to a lens capable of being integrated with an additional optical device such as optical filter, and to an optical composite structure fabricated by integrating such a lens with an additional optical device.

BACKGROUND ART

In optical filter modules such as optical synthesizers, splitters and equalizers and other optical modules such as optical isolators and circulators that are used in optical communication technology, used is an optical composite structure in which a convex microlens for light collimation, convergence or expansion is optically connected with an additional optical device, for example, with an optical filter.

For optically connecting the convex lens with the other optical device in such optical modules, generally employed is a technique of accurately controlling the relative position of the convex lens and the other optical device for reducing the light loss through them, and fixing them in the respective holders such as cases. However, the process requires accurate position control, which causes low productivity and high production costs.

To solve the problem, used is a refractive index-distributed lens for optical collimation, and this is integrated with an additional optical device. Since such a refractive index-distributed lens exhibits its lens function on the basis of the refractive index profile thereof, its face through which it receives and emits light can be planarized. Accordingly, when an additional optical device is airtightly bonded to the planarized face of the lens of the type and when the outer periphery of the bonded area of the two is coated with an adhesive and the adhesive is cured, then the relative position of the lens and the optical device to be bonded thereto can be accurately controlled and the two can be well bonded and fixed.

DISCLOSURE OF THE INVENTION

Naturally, however, refractive index-distributed lenses are not easy to produce just as it is designed. Therefore, for refractive index-distributed lenses of an ordinary type which do not have a convex face and which exhibit their lens function only on the basis of their refractive index profile, it is difficult to have the intended optical characteristics including the optical path, and so on. Another problem with the lenses of the type is that they are unfavorable for small-sized appliances since they require a predetermined or more length for exhibiting their lens function.

Still another problem is that the uncured adhesive applied to such a refractive index-distributed lens and an optical device to be bonded thereto with it will often penetrate into the interface of the two bonded with it, owing to its capillary action. Still another problem is that the additional optical device may often meet a refractive index-distributed lens at some angles at their interface at which they are bonded, thereby forming a gap between the lens and the additional optical device. If so, an uncured adhesive for bonding them will penetrate into the gap. When the adhesive reaches the center part of the bonded area of the two, including the optical path of the lens, it will block the optical path and thereby enlarges the optical loss in the bonded structure. Depending on the temperature change in service condition, the adhesive having penetrated into the interface of the bonded structure will expand or shrink, therefore often causing misregistration of the optical device relative to the lens, or as the case may be, the constitutive components of the structure will be brought into contact with each other to generate stress that further enlarges the optical loss through the structure.

To solve the problems, an adhesive of high viscosity may be used for preventing it from penetrating into the bonded area. However, even when the adhesive of the type is used, it is still impossible to completely prevent it from penetrating into the bonded area. In addition, such an adhesive of high viscosity causes other problems in that its amount to be applied to the parts to be bonded with it is difficult to control and it requires an expensive dispenser for applying it to the parts to be bonded with it. Naturally, in addition, the thermal expansion of the adhesive for optical use must below, and the latitude in selecting adhesives of desired viscosity for optical use is extremely narrow.

The present invention has been made for solving the problems noted above, and its object is to provide a lens which is easy to produce and has desired optical characteristics, which may be integrated with any other optical device to fabricate small-sized appliances and which suffers little optical loss that may be caused by the adhesive having penetrated into the bonded area of the lens and the additional optical device, and to provide an optical composite structure that comprises the lens.

To attain the object as above, the lens of the invention is so constituted that it comprises a lens face including a convex area that exhibits the lens function thereof and a bonding part formed for bonding an additional optical device to the lens face in another part thereof that is not to be the optical path of the lens.

The optical composite structure of the invention is so constituted that it comprises the lens and an additional optical device bonded thereto, in which the optical device is bonded to the bonding part of the lens with an adhesive.

According to the invention, the light applied to the lens is collimated, conversed or expanded through the convex area formed in the lens face, and therefore, the optical characteristics including the focal length of the lens can be designed in any desired manner by suitably combining the parameters such as the refractive index and the curvature of the convex area of the lens. Accordingly, when the curvature of the convex area of the lens is set large and the focal length thereof is set short, then the lens may be small-sized.

In case where an additional optical device such as a filter is bonded to the lens, it can be accurately positioned on the basis of the bonding part of the lens. Not requiring any specific position control or fixation, the relative position of the lens and the additional optical device can be accurately controlled. Accordingly, the optical composite structure of the invention has the advantages of accurate position control and low optical loss.

Of the lens of the invention, the bonding part is formed in a part of the lens face that is not to be the optical path thereof. Therefore, even when an adhesive is used for bonding an additional optical device to the lens, it is prevented from reaching the optical path of the convex face of the lens to block it. Accordingly, the optical composite structure of the invention suffers little optical loss and its productivity is high.

In these drawings, 10 indicates a lens; 12 indicates a rod part; 14 indicates an inclined face; 16 indicates a lens face; 16a indicates a convex face; 16b indicates a bonding part; 16c indicates a groove; 20 indicates an optical composite structure; 22 indicates an optical filter; 24 indicates an adhesive; 30 indicates a lens; 40 indicates a lens; 50 indicates an optical composite structure; 60 indicates a preform; 70 indicates a mold; and 72a indicates a cavity.

BEST MODES OF CARRYING OUT THE INVENTION

Embodiments of the invention are described below with reference to the drawings.

Figure 1:
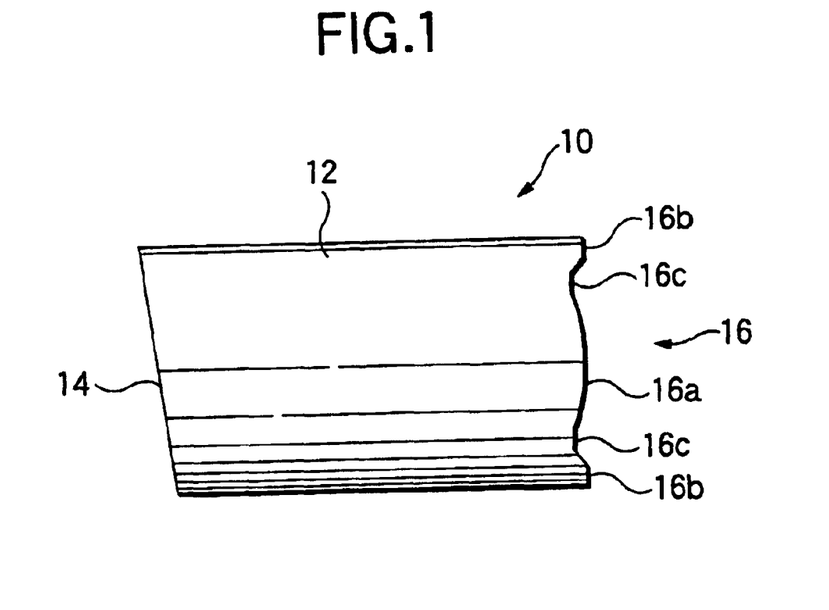
FIG. 1 is a cross-sectional view showing the outline of the first embodiment of the lens of the invention.
Figure 2:
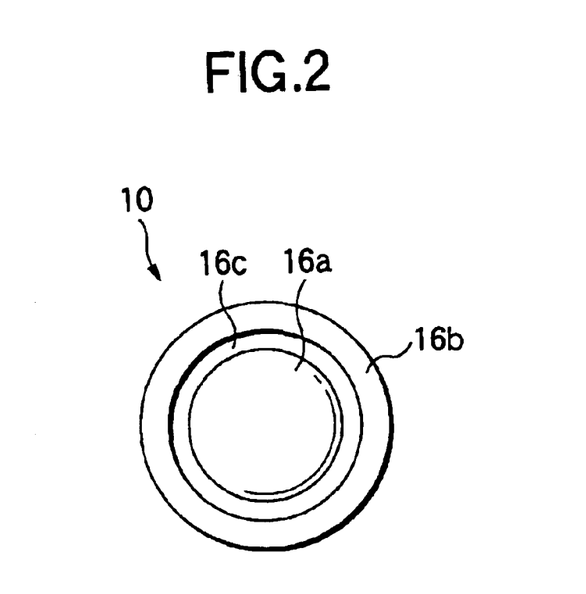
FIG. 2 is a front view showing the outline of the first embodiment of the lens of the invention.

FIG. 1 and FIG. 2 show the first embodiment of the lens of the invention.

The lens 10 has a columnar rod part 12. One end of the rod part 12 is an inclined face 14 which meets the face perpendicular to the center axis running in the longitudinal direction of the rod part 12, at a predetermined angle (for example, at 8°).

The other end of the rod part 12 is a lens face 16 which includes a convex face 16a for light collimation, convergence or expansion, and a bonding part 16b at which the lens 10 is bonded to an additional optical device. The convex face 16a may be spherical or non-spherical. When the convex face 16a is non-spherical, the aberration of the lens 10 may be greatly reduced as compared with that of spherical lenses or refractive index-distributed lenses, and the efficiency in bonding the lens 10 to a light guide such as an optical fiber can be enhanced. The optical axis of the lens 10 is positioned in the line of the center axis that runs in the longitudinal direction of the rod part 12 and crosses the vertex of the convex face 16a.

Of the columnar lens 10 of the type, the length in the optical axis direction is preferably larger than the diameter of the lens. Having the constitution, the lens does not fall down and is stably self-sustainable when set in optical systems. In addition, the lens is easy to handle. When the diameter of the columnar lens is made the same as the capillary of the optical fiber to which the lens is connected, the lens is easy to fix in a holder such as a tube.

In case where the lens 10 is used for a collector lens, the condition under which the parallel light incident on the convex face 16a forms a focal point in the inclined face 14 is indicated by the following equation:

$$R/L_0 = (n-1)/n$$

in which $L_0$ indicates the lens length, or that is, the distance between the center of the inclined face 14 and the center of the convex face 16a which is to be the optical axis of the lens 10; R indicates the curvature of the convex face; and n indicates the refractive index of the lens.

Accordingly, when the length of the lens 10 is made the same as or a little shorter than Lo, then the light emitted through the inclined face 14 can be efficiently introduced into a light guide such as an optical fiber that is kept in contact with the inclined face 14 or is positioned adjacent to the inclined face 14 via a minor space therebetween. Concretely, it is desirable that the length of the lens 10 in its axial direction is the same as $L_0$ or is shorter than $L_0$ by preferably at most 3 mm. If its length is too short, the lens will have a problem of aberration. So far as the lens length is only a little shorter than $L_0$, fine control in lens alignment is possible, for example, when the lens is connected with an optical fiber in a mode of butt alignment. In that condition, the efficiency of bonding the lens to the optical fiber is enhanced. The effective diameter (D) of the convex face 16 is defined by the numerical aperture (NA) of the lens and the lens length (L), and it is at least L×NA. In case where the lens 10 is used for a collimator lens, it receives light through the inclined face 14 and emits the paralleled light through the convex face 16.

The bonding part 16b has a ring shape that surrounds the convex face 16a. Accordingly, a ring-shaped groove 16c is formed between the convex face 16a and the bonding part 16b. The bonding part 16b protrudes outside in the longitudinal direction of the rod part 12 from the outer periphery of the convex face 16a. The top face of the bonding part 16b is on a level with the vertex of the convex face 16a, or it protrudes a little more outside than the vertex of the convex face 16a. The top face of the bonding part 16b is made flat, and it is perpendicular to the optical axis of the lens.

It is desirable that the bonding part 16 does not protrude in the radial direction of the rot part but protrudes only in the direction of the optical axis (that is, in the longitudinal direction) of the lens. Concretely, it is desirable that the diameter of the cross section of the rod part is kept constant anywhere in the direction of the optical axis of the columnar lens 10.

If the bonding part protrudes outside in the direction of the diameter of the lens, the structure of the mold to be used in press-molding the lens will be complicated. If so, in addition, the outside-protruding part will be a bar to alignment control of the lens in a holder such as a tube.

The bonding part is formed in a part of the lens face that is not to be the optical path of the lens. Preferably, it is formed entirely or partly along the outer periphery of the lens face. Having the constitution, the structure of the mold to be used in press-molding the lens is simplified and, in addition, an additional optical device is readily bonded to the outer periphery of the lens with an adhesive.

The lens 10 may be integrally formed of a material transparent to light. The transparent material includes, for example, glass such as quartz glass, borosilicate glass, lanthanum glass, flint glass, niobium glass, barium glass, and plastics such as PMMA and polycarbonate. Preferably, the lens of the invention is formed of glass of low birefringence and low thermal expansion. In case where the lens of the invention is formed of such glass, it is desirable that the glass for it is of high waterproofness in order that the lens formed of it is not degraded to be whitened or blued in high-temperature and high-humidity surroundings.

When the lens 10 is formed of glass of which the thermal expansion coefficient is the same as or extremely near to that of the additional optical device to be bonded thereto, then the difference between the lens 10 and the additional optical device in dimensional fluctuation that may be caused by thermal expansion is small, and, as a result, the reliability to heat cycle and heat shock of the bonded structure may be increased.

In general, the lens 10 is a convex lens formed of a homogeneous material with no refractive index profile. Even a lens having some refractive index profile may also apply to the invention so far as it has a convex face formed for reducing its aberration.

Next described is the optical composite structure that comprises the lens 10.

Figure 3:
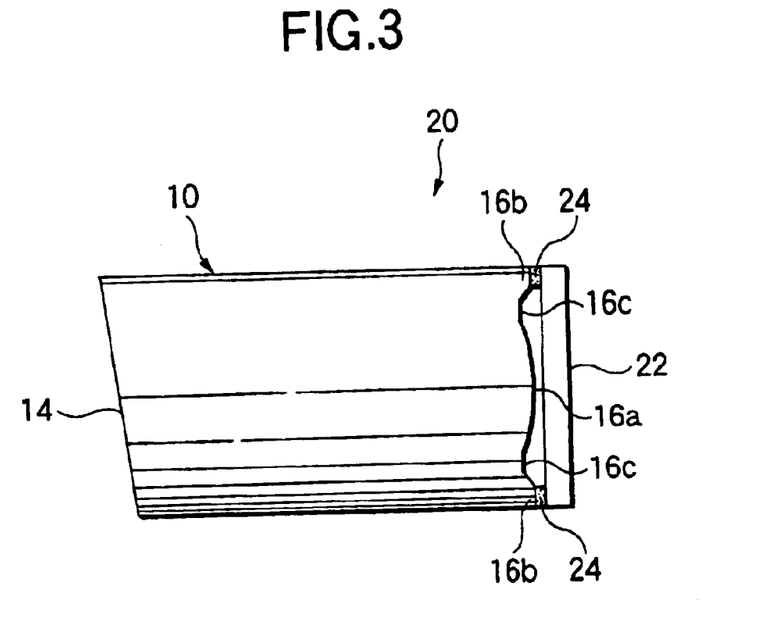
FIG. 3 is a cross-sectional view showing the outline of the optical composite structure that comprises the first embodiment of the lens of the invention.
Figure 4:
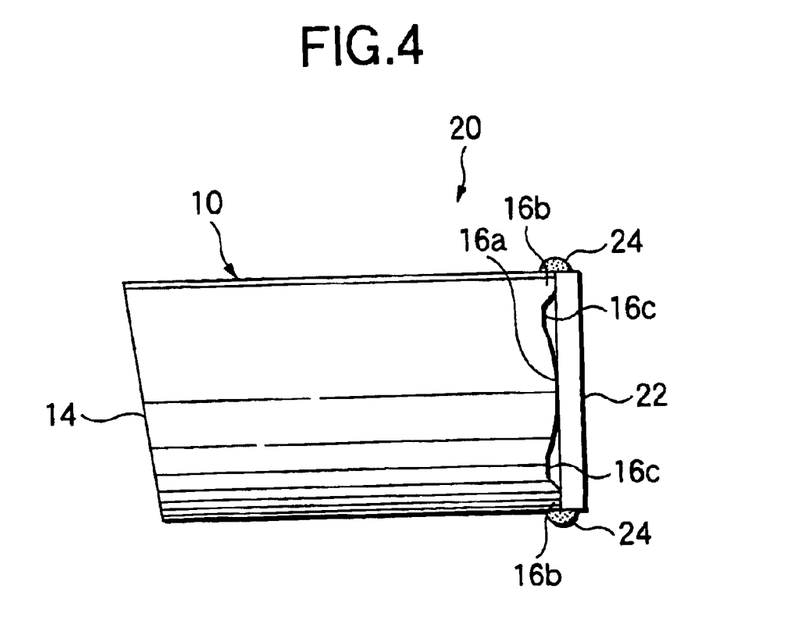
FIG. 4 is a cross-sectional view showing the outline of another example of the optical composite structure that comprises the first embodiment of the lens of the invention.
Figure 5:
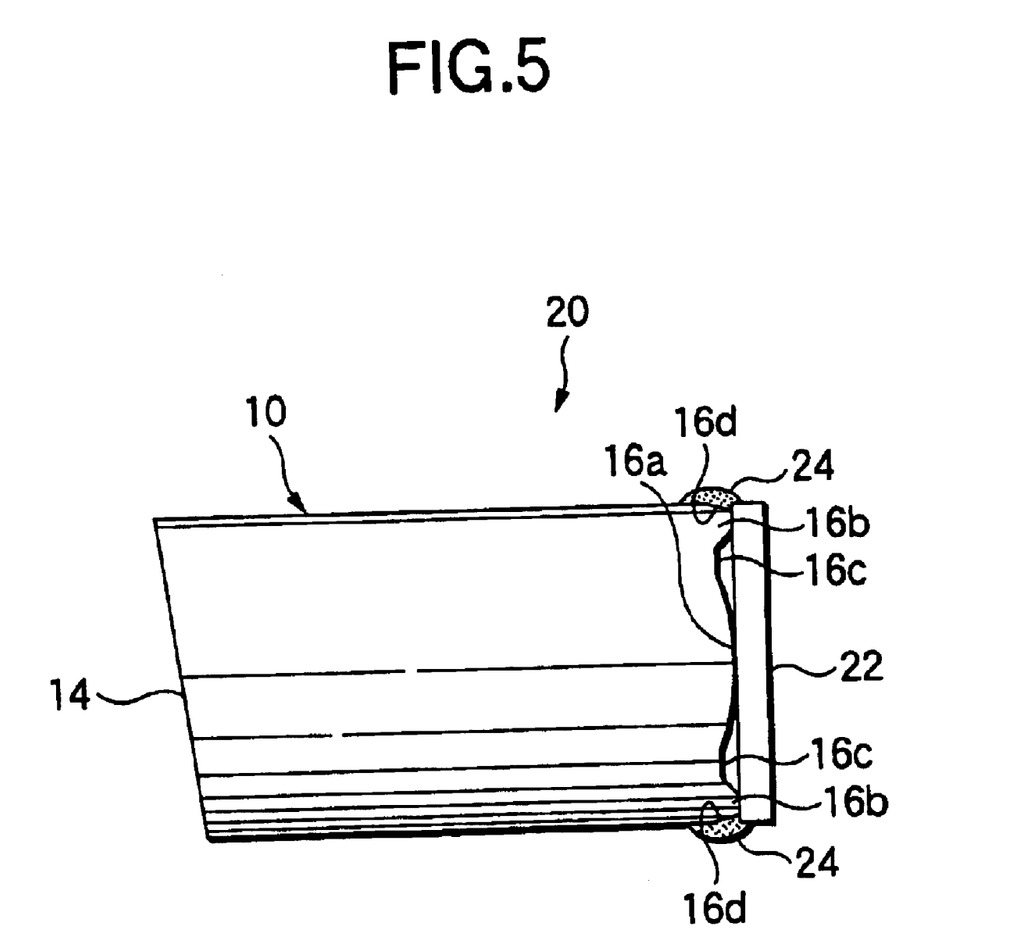
FIG. 5 is a cross-sectional view showing the outline of still another example of the optical composite structure that comprises the first embodiment of the lens of the invention.

As in FIG. 3 to FIG. 5, the optical composite structure 20 comprises the lens 10 and an optical filter 22 bonded to the lens 10. One peripheral face of the optical filter 22 is airtightly bonded to the bonding part 16 of the lens 10. For the optical filter 22, for example, usable are any of a wavelength-selective filter that transmits light of specific wavelengths only and reflects light of other wavelengths, a light equalization filter that equalizes light of which the intensity is not constant relative to its wavelength, or a light branching filter that branches light by transmitting a specific ratio of the light applied thereto but reflecting the other part thereof. The optical filters of those types are, for example, multi-layered dielectric filters fabricated by alternately laminating high-refractivity dielectric films and low-refractivity dielectric films.

For bonding the optical filter 22 to the lens 10, an adhesive 24 is applied between the top face of the bonding part 16b and the bonding face of the optical filter 22, as in FIG. 3. Alternatively, the adhesive 24 may be applied to the outer periphery around which the bonding part 16b is kept in contact with the bonding face of the optical filter 22, as in FIG. 4. In this case, the bonding part 16b is worked to have a taper part 16d in order that the contact area of the bonding part 16b with the adhesive 24 may be increased to thereby enhance the bonding strength, as in FIG. 5.

The adhesive 24 is of high viscosity, generally having, for example, a viscosity of at least 10,000 mpas. The adhesive 24 of the type hardly penetrates into the bonded interface between the lens 10 and the optical filter 22, and, even if having penetrated there into, the adhesive 24 can be readily caught by the groove 16c to stay therein. For preventing misregistration of the optical filter that may be caused by the shrinkage on curing of the adhesive 24, the adhesive 24 is of low cure shrinkage of generally at most 4%. For the adhesive 24 of the type, for example, usable are UV-curing epoxy or acrylate resins.

When the optical filter 22 is bonded to the lens 10 according to the invention, the two may be well positioned relative to each other on the basis of the bonding part 16b of the lens 10. Therefore, the optical composite structure 20 thus fabricated herein has the advantage of accurately positioning the constitutive components. The bonding part 16b is on a level with the vertex of the convex face 16a, or it protrudes more outside than the convex face. 16a. Therefore, when the optical filter 22 is bonded to the lens 10, it does not collide against the convex face 16a to damage it. In addition, when the adhesive 24 used for bonding the optical filter 22 to the lens 10 penetrates into the bonding interface between the two, this stays in the groove 16c between the bonding part 16b and the convex face 16a, not reaching the center part of the convex face 16a that includes the optical path of the lens. In that condition, therefore, the optical path of the lens is not blocked by the adhesive 24. Accordingly, the optical composite structure of the invention is easy to fabricate, and the optical loss therein is small.

In the optical composite structure of the invention, the optical part to be bonded to the lens 10 may be any and every one having a flat face capable of bonding to the bonding part 16b of the lens 10. For example, it includes polarizing plates, optical crystals, refractive index-distributed lenses, and so on.

Next described are other embodiments of the invention. In the following description, the same components as those mentioned herein above are designated by the same reference numerals as herein above, and their detailed description is omitted herein.

Figure 6:
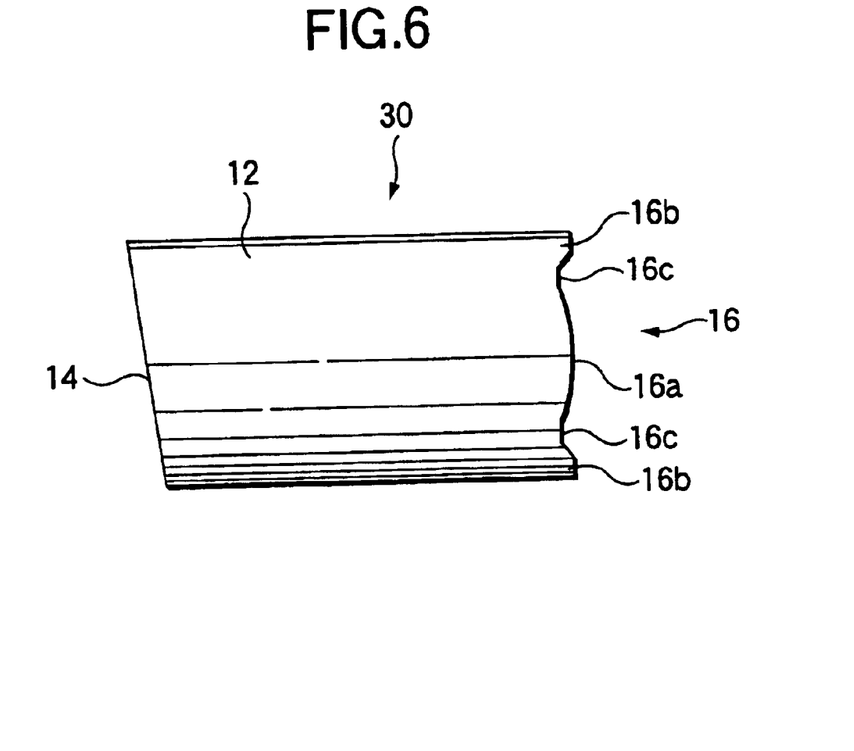
FIG. 6 is a cross-sectional view showing the outline of the second embodiment of the lens of the invention.
Figure 7:
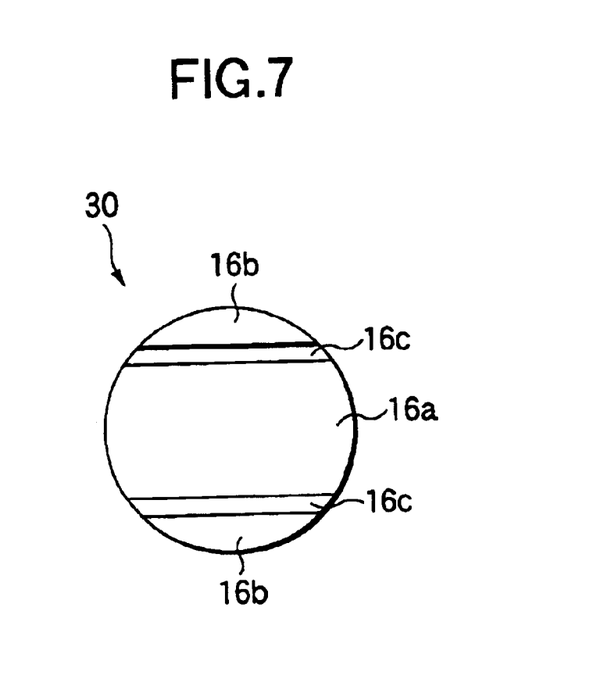
FIG. 7 is a front view showing the outline of the second embodiment of the lens of the invention.

FIG. 6 and FIG. 7 show the second embodiment of the lens of the invention.

Outside its convex face 16a, the lens 30 has two bonding parts 16b that are opposite to each other via the convex face 16a. Having the constitution, the lens 30 has two parallel grooves 16c formed between the convex face 16a and each bonding part 16b. Like in the first embodiment, the bonding parts 16b protrude outside the convex face 16a in the longitudinal direction of the rod part 12, and the flat top face of each bonding part 16b is on a level with the vertex of the convex face 16a, or it protrudes a little more outside than the vertex of the convex face 16a.

When an optical filter 22 is bonded to the lens 30 to fabricate an optical composite structure, an adhesive 24 is applied between the top face of each bonding part 16b and the bonding face of the optical filter 22, or it is applied to the outer periphery around which the bonding parts 16b are kept in contact with the bonding face of the optical filter 22, also like in the first embodiment.

Accordingly, the optical composite structure of this embodiment is easy to fabricate and the optical loss therein is small, like that of the first embodiment.

Figure 8:
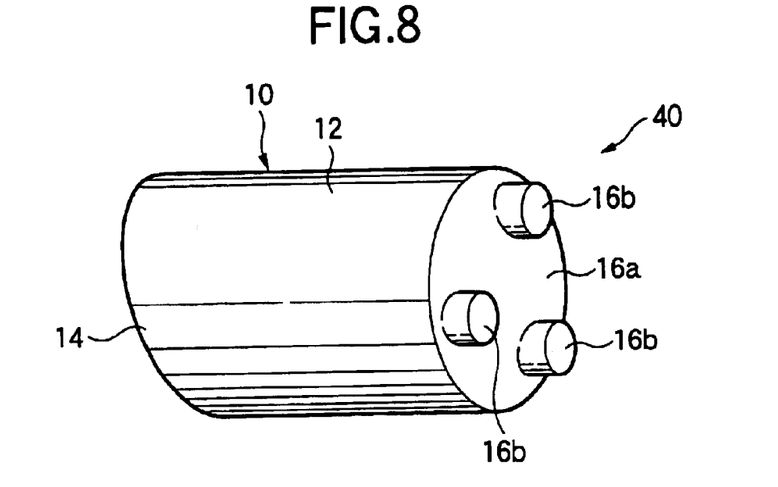
FIG. 8 is a perspective view showing the outline of the third embodiment of the lens of the invention.
Figure 9:
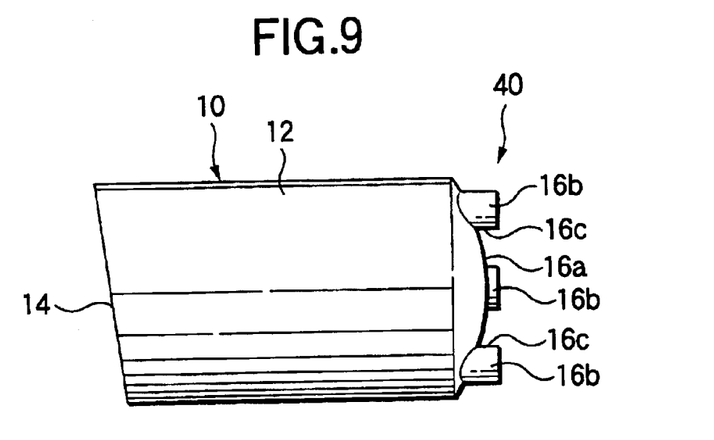
FIG. 9 is a cross-sectional view showing the outline of the third embodiment of the lens of the invention.
Figure 10:
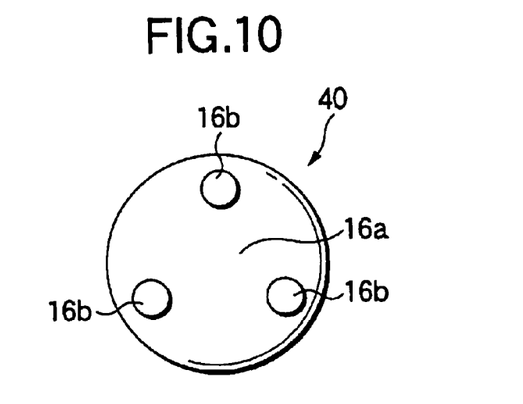
FIG. 10 is a front view showing the outline of the third embodiment of the lens of the invention.

FIG. 8 to FIG. 10 show the third embodiment of the lens of the invention.

In the area that is outside its convex face 16a and does not including its optical path, the lens 40 has three columnar bonding parts 16b formed at regular intervals. Like in the first embodiment, the bonding parts 16b protrude outside the convex face 16a in the longitudinal direction of the rod part 12, and the flat top face of each bonding part 16b is on a level with the vertex of the convex face 16a, or it protrudes a little more outside than the vertex of the convex face 16a. Having the constitution, there is formed a space between the convex face 16a and the bonding parts 16b.

Figure 11:
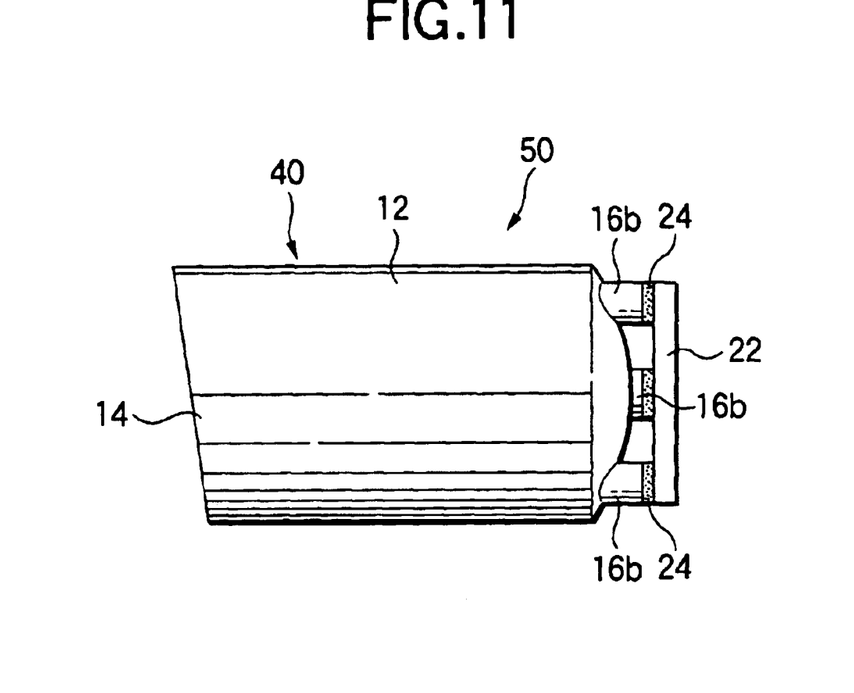
FIG. 11 is a cross-sectional view showing the outline of the optical composite structure that comprises the third embodiment of the lens of the invention.
Figure 12:
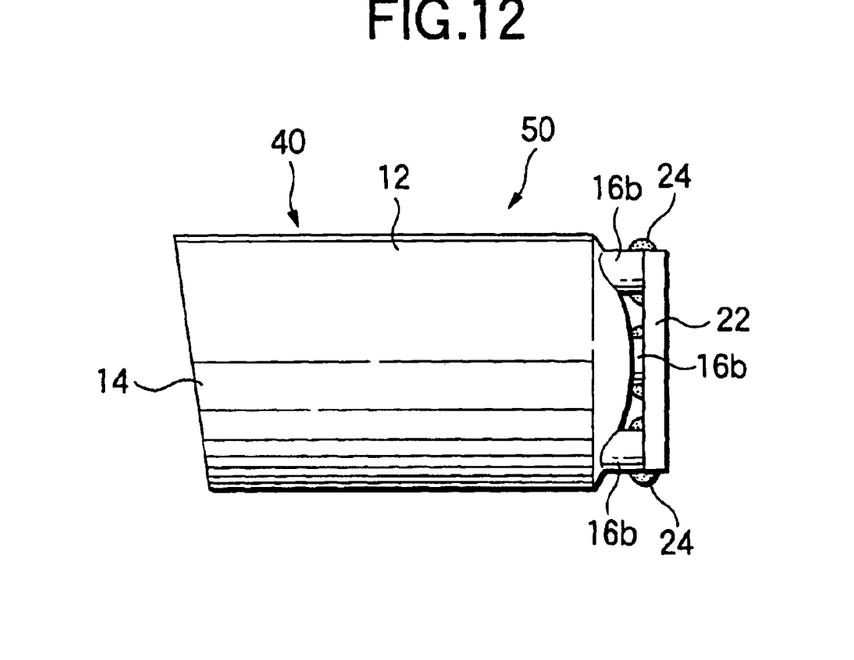
FIG. 12 is a cross-sectional view showing the outline of another example of the optical composite structure that comprises the third embodiment of the lens of the invention.

For bonding an optical filter 22 to the lens 40 to fabricate an optical composite structure 50, an adhesive 24 is applied between the top face of each bonding part 16*b* and the top face of the optical filter 22, as in FIG. 11; or the adhesive 24 is applied to the outer periphery around which each bonding part 16*b* is kept in contact with the bonding face of the optical filter 22, as in FIG. 12.

Accordingly, the optical composite structure of this embodiment is easy to fabricate and the optical loss therein is small, like that of the first embodiment.

Next described is the method for producing the lens of the invention.

The lens of the invention can be integrally molded according to a technique of mold optics, for example, by press-molding a glass material (preform) that has been softened under heat, in a mode of compression molding in a mold. In this method, the mold to be used has a cavity corresponding to the shape of the lens to be produced. In the mold, the lens face and the inclined face of the lens are formed at the same time. Apart from this, however, the inclined face of the lens may not be formed in the molding process but may be formed by polishing the face to be inclined of the lens after the lens has been press-molded. Plastic lenses of the invention may be molded in ordinary injection molding.

One example of the method of using glass for producing the lens 10 of FIG. 1 and FIG. 2 is described below.

Figure 13:
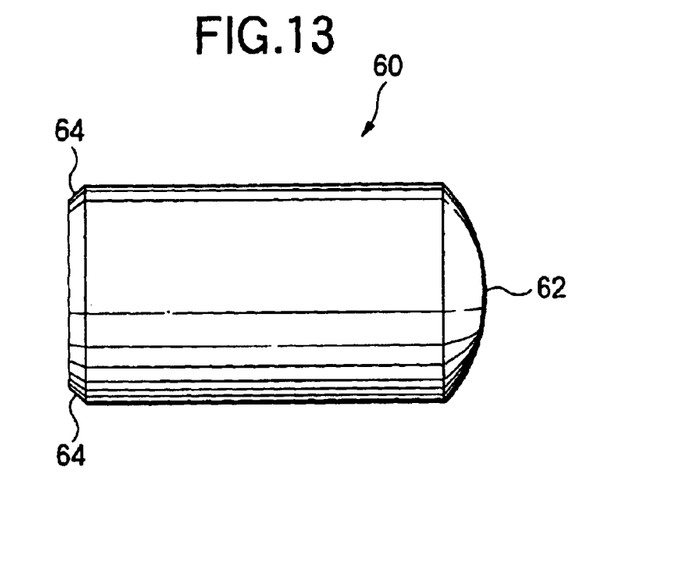
FIG. 13 is a cross-sectional view showing the outline of a preform for producing the first embodiment of the lens of the invention.

FIG. 13 shows a preform 60 before pressed. The preform 60 is a columnar part made of glass. One face of the preform 60 that is to be a convex face of the lens to be produced is curved to have a curved face 62 that is similar to the convex face of the lens. This is for enhancing the profile accuracy of the convex face of the lens to be produced. The curved face 62 may be formed, for example, by chamfering or polishing one face of the preform to be curved, or by melting that one end with laser or the like to thereby make it a free curved face owing to the surface tension of glass. The other end of the preform 60 that is to be the inclined face of the lens to be produced is chamfered to form a taper part 64 around it.

In case where the lens to be produced is made to have an inclined face opposite to the convex face thereof, the other end of the preform that is to be the inclined face of the lens may also be curved. Having the constitution, both ends of the perform are curved. The advantages of the preform of which the other end to be the inclined face of the lens is curved are that the deformation in molding the preform is reduced and the inclined face of the lens can, be formed with accuracy.

Figure 14:
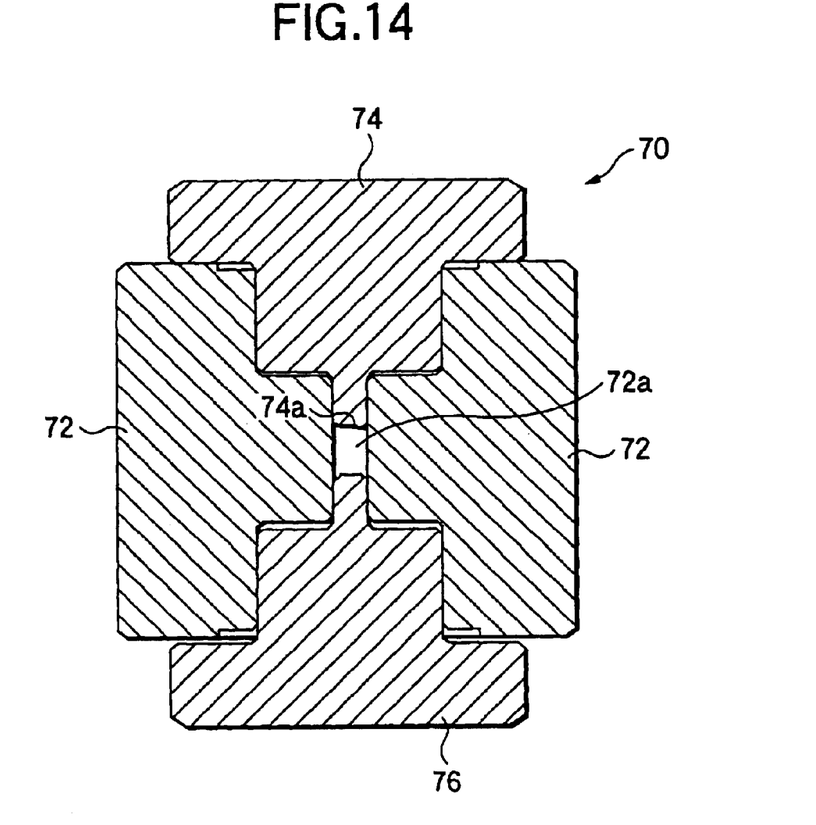
FIG. 14 is a cross-sectional view showing the outline of a mold for producing the first embodiment of the lens of the invention.
Figure 15:
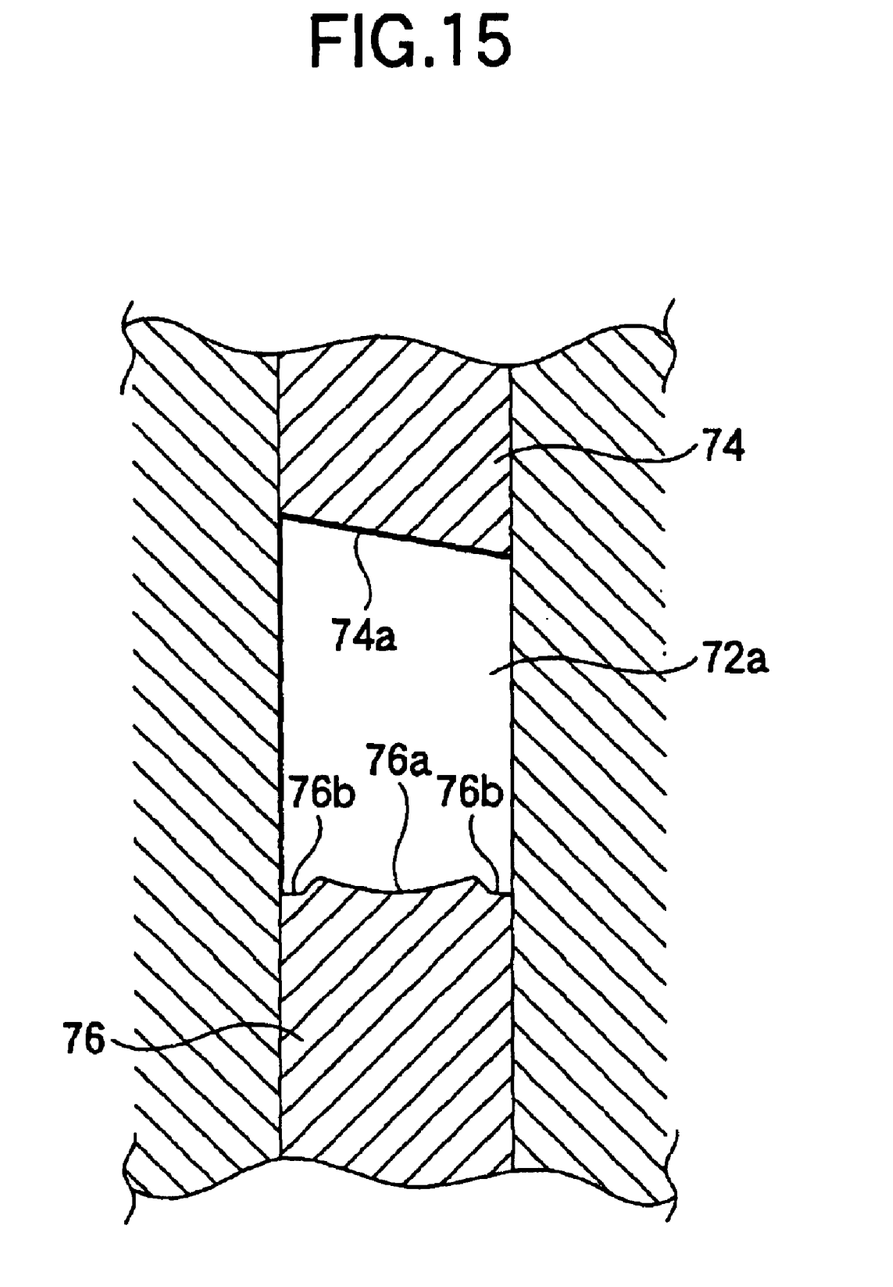
FIG. 15 is an enlarged cross-sectional view showing the outline of the mold for producing the first embodiment of the lens of the invention.

FIG. 14 and FIG. 15 show a mold 70 for pressing the preform 60 into a lens 10. The mold 70 comprises a sleeve 72 having a cylindrical cavity 72*a*, an upper mold 74 for forming the inclined face 14 of the lens 10, and a lower mold 76 for forming the lens face 16 of the lens 10. The molding face of the upper mold 74 is formed to have an inclined face-forming face 74*a* which is to form the inclined face 14 of the lens 10; and the molding face of the lower mold 76 is formed to have a convex face-forming face 76*a* which is to form the convex face 16*a* of the lens 10 and have a bonding part-forming face 76*b* which is to form the bonding part 16*b* of the lens 10. Having the constitution, the upper mold 74 and the lower mold 76 are inserted into the cavity 72*a* of the sleeve 72 to form a cavity that corresponds to the shape of the lens 10 to be molded in the mold. The inner face of the cavity is coated with a release film such as a platinum film or a carbon film that makes it easy to release the molded lens from the mold.

When the preform 60 is molded into the lens 10 of the invention in the mold 70, it is first inserted into the cavity 72*a* of the sleeve 72, and then heated up to the softening point thereof. In that condition, the preform 60 is compressed between the upper mold 74 and the lower mold 76, and it is there by deformed into the shape that corresponds to the cavity in the mold. After the preform 60 has been thus compressed, the mold 70 with it therein is cooled, and the shaped article, lens is released from the mold. Through the process, the lens 10 of the invention can be obtained.

Not limited to the embodiments mentioned herein above, the invention can be changed or modified in any desired manner. For example, the embodiments mentioned above are columnar lenses, but, apart from them, the invention is applicable also to tabular lenses. For such tabular lenses, spherical preforms may be used. In addition, the invention is applicable also to polygonal columnar lenses such as tetragonal columnar lenses. Of the lenses of the embodiments mentioned above, the other face opposite to the convex face is inclined, but it may be a flat face perpendicular to the optical path of the lens, or may be a convex or concave face. When the other face opposite to the lens face thereof is curved, the lens is easy to mold and its curved face can prevent the light reflected thereon from going back into the lens.

If desired, both the convex face to be the lens face and the other face opposite to the lens face may have a bonding part formed thereon.

EXAMPLES

The invention is described in detail with reference to the following Examples.

Lanthanum glass (Hoya's Lot No. La F81) having a refractive index at 1,550 nm of about 1.702 was cut and polished into a column having a diameter of 1.76 mm and a length of 3.8 mm.

One end of the column was polished into a curved face having a radius of curvature of 1.3 mm, while the other end thereof was chamfered by 0.15 mm. Thus worked, a preform of FIG. 13 was obtained.

For molding the preform, used was a mold for glass (Nippon Tungsten's Model OM3), which was formed of an ultra-hardmaterial as in FIG. 14 and FIG. 15. The lower part of the mold was patterned to have a convex face-forming face and a bonding part-forming face; while the upper part thereof was worked to have an inclined face-forming face which is for forming an inclined face that meets the face perpendicular to the optical path of the lens to be molded, at an angle of 8°.

The molding face of the upper and lower molds and the inner face of the sleeve were coated with are lease film of platinum having a thickness of 300 nm.

The preform mentioned above was set in the mold, and the mold was set in a pressing machine. This was heated up to 550° C. in nitrogen gas and pressed under a load of 50 kg. After cooled, the thus-molded article was taken out of the mold. As a result, a lens having the shape of FIG. 1 and FIG. 2 was obtained. The diameter of the lens was 1.798 mm; the radius of curvature of the curved face thereof was 1.47 mm; and the length thereof was 3.32 mm on its optical path. The focal length of the lens was 2.09 mm. When parallel light was introduced into the lens from the side of the lens face, it formed an image on the optical path of the lens outside the 8°-inclined facet 14, spaced from the face by about 150 $\mu$m.

An optical filter was bonded to the lens to fabricate an optical composite structure. The optical filter used is a multi-layered dielectric filter (having a size of 1.4×1.4 mm with a thickness of 1.0 mm) that transmits light of a center wavelength 1550 nm but reflects the other light. The filter was airtightly attached to the bonding part of the lens, and the outer face around the attached area of the two was spotted with a UV-curing epoxy resin adhesive, which was then cured through exposure to UV rays. The process gave an optical composite structure.

40 optical composite structure of the type were fabricated, and individually observed with an optical microscope from the side of the filter of each structure. Thus inspected, those in which the adhesive did not penetrate in the range of 600 µm around the center of the optical path of the lens are good; while those in which the adhesive penetrated in that range are not good. As a result, 38 of 40 samples fabricated and tested herein were good, and this means that the productivity in the process is 95% and is high.

The invention has been described in detail with reference to some specific embodiments thereof. However, it is obvious to anyone skilled in the art that the invention can be changed and modified in any desired manner, not overstepping the spirit and the scope thereof.

The present application is based on a Japanese patent application (Application No. 2001-007019) filed on Jan. 15, 2001, of which the contents are hereby incorporated for reference.

INDUSTRIAL APPLICABILITY

As is obvious from the above description, the convex face formed in the lens face of the lens of the invention has a lens function. Therefore, as compared with other ordinary refractive index-distributed lenses which do not have a convex face but exhibit their lens function only in accordance with the refractive index profile thereof, the latitude of the lens of the invention in designing the optical characteristics such as the focal length thereof is broad, and the lens of the invention can be small-sized.

In addition, when an additional optical device such as filter is bonded to the lens to fabricate an optical composite structure, its position can be well controlled on the basis of the bonding part of the lens. Therefore, the optical composite structure comprising the lens is easy to produce, the positioning accuracy in fabricating it is high, and the light loss in the structure is small.

Moreover, since a groove is formed between the bonding part and the convex face of the lens, the uncured adhesive having penetrated into the bonding interface between the lens and the additional optical element bonded thereto may be kept staying in the groove and therefore it does not reach the convex face to be the optical path of the lens to block the optical path. Accordingly, the light loss in the optical composite structure of the invention is reduced.

What is claimed is:
1. A glass lens which comprises:

a columnar rod part, and a lens face part formed on one end of the rod part to include a convex area that exhibits lens function thereof, wherein a bonding part is formed on a part of said convex area of the lens that is not to be an optical path of the lens, by which an additional optical device can be bonded to said bonding part of the lens.

2. The lens as claimed in claim 1, wherein the bonding part protrudes outside in a direction of an optical axis that the convex face includes, at least to the height not lower than the vertex of the convex face.

3. The lens as claimed in claim 1, wherein the bonding part is formed to surround the optical axis which the convex face includes.

4. The lens as claimed in claim 1, wherein the bonding part is formed in two sites opposite to each other via the optical axis which the convex face includes.

5. The lens as claimed in claim 1, wherein the bonding part is formed in multiple sites around the optical axis which the convex face includes.

6. The lens as claimed in any one of claims 1 to 5, which is integrally molded by pressing.

7. An optical composite structure which comprises the lens of any one of claims 1 to 5, and an additional optical device bonded to the lens, and in which the optical device is bonded to the bonding part of the lens with an adhesive.

8. An optical composite structure which comprises the lens of claim 6, and an additional optical device bonded to the lens, and in which the optical device is bonded to the bonding part of the lens with an adhesive.

* * * * *